Apr. 10, 1923.

C. E. ZACHARY

AIR BRAKE TEST VALVE

Filed Sept. 30, 1919

1,451,644

WITNESSES
N. T. Walker
P. D. Rollhaus

INVENTOR
C. E. Zachary
BY
Munn & Co.
ATTORNEYS

Patented Apr. 10, 1923.

1,451,644

UNITED STATES PATENT OFFICE.

CHARLES E. ZACHARY, OF ATLANTA, GEORGIA.

AIR-BRAKE TEST VALVE.

Application filed September 30, 1919. Serial No. 327,360.

*To all whom it may concern:*

Be it known that I, CHARLES E. ZACHARY, a citizen of the United States, and a resident of the city of Atlanta, in the county of Fulton and State of Georgia, have invented a new and Improved Air-Brake Test Valve, of which the following is a full, clear, and exact description.

This invention relates to improvements in air brake test valves, an object of the invention being to provide a device which can be located anywhere in the pipe line of a train, and which will serve to locate a leaky valve or break anywhere in the line.

It frequently happens, particularly on freight trains, that a valve or a portion of the line becomes leaky and when this takes place, the operation of the service brakes causes the emergency brakes to operate and results in jolts, jars and bumping action which is not only disagreeable but is injurious to the train. A great deal of time is lost not only because of the bad action of the brakes, but in an endeavor to locate the leaky valve and it is the purpose of my invention to provide a device which can be inserted in the pipe line and which will locate the particular car where the leak occurs. When the leak is found, the air brake apparatus of the defective car is cut out and the brakes of the other cars can be effectually operated until the car can be brought in and repaired.

With these and other objects in view, the invention consists in certain novel features of construction and combinations and arrangements of parts as will be more fully hereinafter described and pointed out in the claims.

In the accompanying drawings:—

1, 1, represent the cars of a train, having air pipes 2, cocks 3, hose 4, and couplings 4', such as are ordinarily employed in connection with air brakes.

Figure 1:
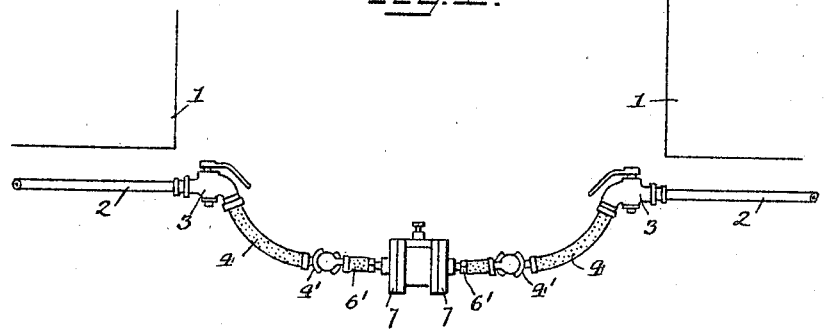
Figure 1 is a fragmentary view in elevation showing my improved device in the air line of a train.
Figure 2:
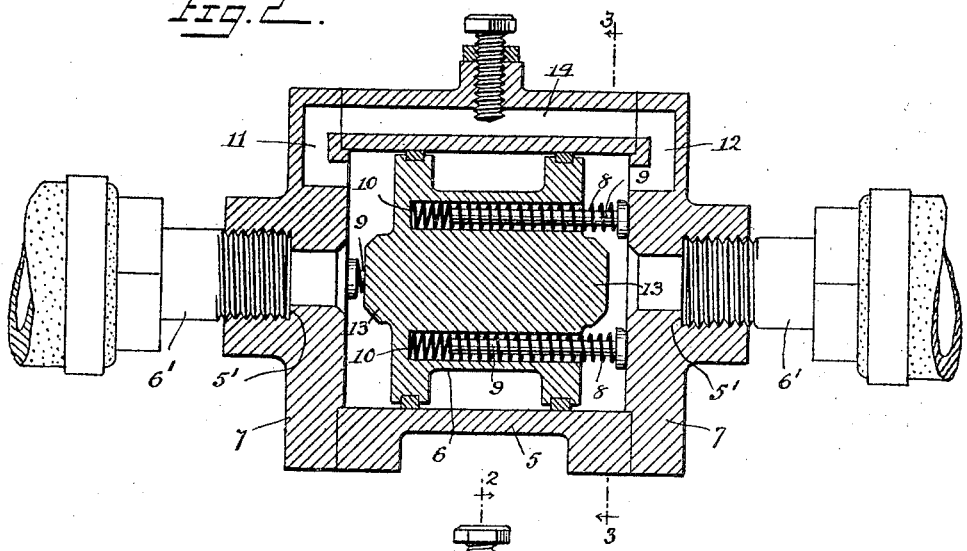
Figure 2 is a view in longitudinal section through the device detached.
Figure 3:
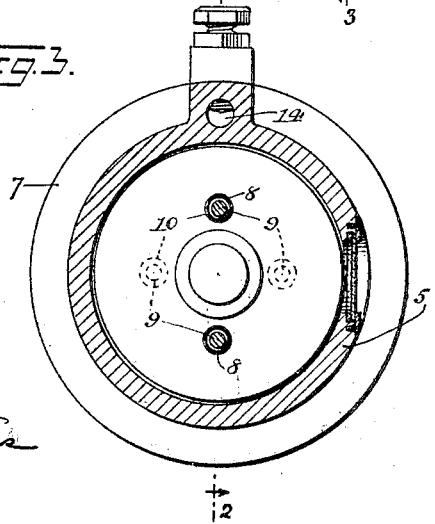
Figure 3 is a view in section on the line 3—3 of Figure 2.

5 is the cylinder or casing of my improved device which has threaded sockets 5' at its ends and coupling sections 6' secured therein, so that the device can be secured to the ordinary couplings of air hose as indicated in Figure 1.

The cylinder 5 has a double-ended piston 6 fitting the same, and held normally in a central position equally spaced from the heads 7, 7, of the cylinder by means of coiled springs 8. The springs 8 are located on pins 9 bearing against the heads 7 and projecting into openings 10 in the piston, and the springs press against the piston holding the latter equally spaced from the heads 7.

The air ports 11 and 12 in the respective heads 7 are opposite the valves 13 on the ends of the piston and are adapted to be closed thereby when the piston moves far enough toward them, as will be understood.

An air passage 14 is provided in the wall of cylinder 5 and in the heads 7, so that normally the air is free to flow through the said passage from one end of the cylinder to the other.

When there is a leak in the line due to a leaky valve or other cause, it is readily apparent because the emergency brakes will operate when the service brakes are applied. The crew in order to detect which car has the leaky valve places my improved test valve in the pipe line. When the air is turned on, if the break is forward of the device, there will be a reduction of pressure at the forward end of the device and the piston will move in that direction to close the passage. The air will gradually equalize in the cylinder and owing to which and to the springs, which have been put under compression the valve will momentarily open but again close and this opening and closing will be very rapid, but will be sufficient to allow the service brakes to work. In order that the position of the valve may be seen, the cylinder is provided with a sight glass *a*. The crew can detect whether the break is forward or in rear of the device and can soon locate the particular car which has the defective apparatus.

As above stated, when the car is located, its air brakes are disconnected from the line and the train can be operated effectually to bring in the car and have it repaired, but the bumping action which is caused by the sudden applying of the air brakes will be entirely overcome. The device will, therefore, operate as a detector to locate a leak and after its work is finished, it is removed and kept by the crew for emergency.

It is the purpose of my invention to provide each train crew with one of these devices which will enable them to quickly locate leaks in the line.

This valve is to be known as the Z. test valve, to be placed in the air brake hose connection on either a freight train or passenger train while standing, to assist in locating a defective brake valve that will cause an undesired reduction in brake pipe pressure.

Various slight changes might be made in the general form of the parts described without departing from my invention, and hence I do not limit myself to the precise details set forth, but consider myself at liberty to make such slight changes and alterations as fairly fall within the spirit and scope of the appended claims.

I claim:—

1. The method herein described of detecting leakage in an air pipe line, consisting in automatically closing and opening, in rapid succession, the section of the pipe in which there is a reduction of pressure due to leakage.

2. A device of the character described, comprising a casing having ports in its ends adapted to communicate with a pipe line and having a by-pass connecting the ends of the valve chamber of the casing, and a balanced and double faced valve in the casing and automatically restored to balance through the medium of the by-pass and adapted to close one or the other of said ports when pressure is reduced in either section of the pipe line.

3. A device of the character described, comprising a casing adapted to be interposed in an air pipe line and having in each end a centrally arranged port and a port at one side of the center of the casing, said casing being provided in its wall with a by-pass opening into the casing through the last named ports, and a balanced and double ended piston valve in the casing.

4. A device of the character described, comprising a cylinder having ports in its ends and a passage in its wall communicating with both ends of the cylinder, a piston in the cylinder, springs normally holding the piston centrally in the cylinder, said piston having openings therein, rods supporting the springs, bearing at their ends against the cylinder and projecting into the holes in the piston, and valves on the piston adapted, when permitted, to close the ports.

CHARLES EUGENE ZACHARY.